United States Patent
Ohshita

Patent Number: 5,627,686
Date of Patent: May 6, 1997

[54] LARGE-APERTURE MEDIUM-RANGE TELEPHOTO LENS SYSTEM

[75] Inventor: Koichi Ohshita, Tokyo, Japan

[73] Assignee: Nikon Corporation, Tokyo, Japan

[21] Appl. No.: 490,890

[22] Filed: Jun. 15, 1995

[30] Foreign Application Priority Data

Aug. 5, 1994 [JP] Japan .................. 6-204595

[51] Int. Cl.$^6$ .................................. G02B 13/02
[52] U.S. Cl. .................. 359/745; 359/684; 359/748
[58] Field of Search .................. 359/748, 786, 359/787, 788, 745, 746, 747, 684

[56] References Cited

U.S. PATENT DOCUMENTS

| | | | |
|---|---|---|---|
| 4,534,626 | 8/1985 | Mihara | 359/745 |
| 4,609,263 | 9/1986 | Imaizumi | 359/745 |

FOREIGN PATENT DOCUMENTS 59-142511  8/1984  Japan .

*Primary Examiner*—Carolyn E. Fields
*Attorney, Agent, or Firm*—Shapiro and Shapiro

[57] ABSTRACT

In a large-aperture medium-range telephoto lens system, which includes, in the following order from the object side, a first lens unit having a positive refractive power, a second lens unit having a negative refractive power, and a third lens unit having a positive refractive power, and attains focusing by moving the second and third lens units along the optical axis while the first lens unit is fixed in position, the telephoto lens system satisfies:

$$0.8 < f1/f < 1.5$$
$$-3.0 < f2/f < -1.0$$
$$0.7 < f3/f < 1.0$$
$$0.02 < |x2/x3| < 0.3$$

where f is the focal length of the entire lens system in an infinity in-focus state, f1 is the focal length of the first lens unit, f2 is the focal length of the second lens unit, f3 is the focal length of the third lens unit, x2 is the moving amount of the second lens unit from the infinity in-focus state to a closest distance in-focus state, and x3 is the moving amount of the third lens unit from the infinity in-focus state to the closest distance in-focus state.

12 Claims, 5 Drawing Sheets

LARGE-APERTURE MEDIUM-RANGE TELEPHOTO LENS SYSTEM

BACKGROUND OF THE INVENTION

1. Field of the Invention

The present invention relates to a large-aperture medium-range telephoto lens system and, more particularly, to a focusing method of a fast medium-range telephoto lens system.

2. Related Background Art

In recent years, along with the widespread use of auto-focusing single-lens reflex cameras, various focusing methods each of which attains focusing by moving only some lens components in a lens system have been proposed. Of these methods, as focusing methods for a so-called telephoto lens system, the following methods are known. In a telephoto lens system which comprises a first lens unit of a positive refractive power, a second lens unit of a negative refractive power, and a third lens unit of a positive refractive power, a so-called internal focusing method which attains focusing by only moving the second lens unit of the negative refractive power is known. On the other hand, in a telephoto lens system which comprises a front lens unit of a positive refractive power and a rear lens unit of a positive refractive power, a rear focusing method which attains focusing by moving only the rear lens unit is known.

However, in the internal focusing method, asymmetry of the optical system is strong, and the field of curvature and astigmatism vary considerably upon focusing. For this reason, it is difficult to apply this method to a lens system with a large field angle.

On the other hand, in the above-mentioned rear focusing method, a variation in image surface can be suppressed by almost symmetrically arranging the front and rear lens units, but then spherical aberration varies greatly.

SUMMARY OF THE INVENTION

The present invention has been made in consideration of the above-mentioned problems, and has as its object to provide a large-aperture medium-range telephoto lens system which can suppress any variation in spherical aberration upon focusing while assuring a desired field angle as a medium-range telephoto lens system.

In order to achieve the above object, according to the present invention, there is provided a large-aperture medium-range telephoto lens system, which comprises, in the following order from the object side, a first lens unit G1 having a positive refractive power, a second lens unit G2 having a negative refractive power, and a third lens unit G3 having a positive refractive power, and attains focusing by moving the second and third lens units G2 and G3 along the optical axis while the first lens unit G1 is fixed in position, wherein the telephoto lens system satisfies:

$$0.8 < f1/f < 1.5$$
$$-3.0 < f2/f < -1.0$$
$$0.7 < f3/f < 1.0$$
$$0.02 < |x2/x3| < 0.3$$

where f is the focal length of the entire lens system in an infinity in-focus state, f1 is the focal length of the first lens unit G1, f2 is the focal length of the second lens unit G2, f3 is the focal length of the third lens unit G3, x2 is the moving amount of the second lens unit G2 from the infinity in-focus state to a closest distance in-focus state, and x3 is the moving amount of the third lens unit G3 from the infinity in-focus state to the closest distance in-focus state.

According to a preferred aspect of the present invention, when a lens, closest to the object side, in the third lens unit G3 is a negative lens component, both the second and third lens units G2 and G3 move toward the object side upon focusing to a close distance object. On the other hand, when a lens, closest to the object side, in the third lens unit G3 is a positive lens component, the second lens unit G2 moves toward the image side and the third lens unit G3 moves toward the object side upon focusing to a close distance object.

As described above, according to the present invention, the telephoto lens system comprises the first lens unit G1 of a positive refractive power, the second lens unit G2 of a negative refractive power, and the third lens unit G3 of a positive refractive power, and attains focusing by moving the second lens unit G2 of the negative refractive power and the third lens unit G3 of the positive refractive power along the optical axis.

As a focusing method of this type, a method disclosed in Japanese Laid-Open Patent Application No. 59-142511 is known. However, according to the focusing method disclosed in the above reference, it is difficult to correct spherical aberration since the refractive power of the first lens unit is too large. Furthermore, since the refractive power of the second lens unit is also excessive, it is difficult to correct a variation in curvature of field as in the above-mentioned internal focusing method.

The present invention can solve the above-mentioned problems associated with aberrations, and can satisfactorily correct the image surface while realizing a large-aperture, wide-angle lens system.

Conditional formulas of the present invention will be explained below.

A medium-range telephoto lens system of the present invention satisfies conditional formulas (1) to (4) below:

$$0.8 < f1/f < 1.5 \quad (1)$$
$$-3.0 < f2/f < -1.0 \quad (2)$$
$$0.7 < f3/f < 1.0 \quad (3)$$
$$0.02 < |x2/x3| < 0.3 \quad (4)$$

where f: the focal length of the entire lens system in an infinity in-focus state f1: the focal length of the first lens unit G1 f2: the focal length of the second lens unit G2 f3: the focal length of the third lens unit G3 x2: the moving amount of the second lens unit G2 from the infinity in-focus state to a closest distance in-focus state x3: the moving amount of the third lens unit G3 from the infinity in-focus state to the closest distance in-focus state Note that the moving amounts x2 and x3 of the second and third lens units G2 and G3 each have a positive sign upon movement toward the object side, and have a negative sign upon movement toward the image side.

According to the present invention, as shown in conditional formula (1), the refractive power of the first lens unit G1 is reduced as much as possible, so that the refractive power of the first lens unit is advantageous for realizing a large-aperture lens system. As shown in conditional formula (2), the refractive power of the second lens unit G2 is also set to be small, so that the image surface can be satisfactorily corrected when a wide field angle is assured.

When f1/f is smaller than the lower limit value of conditional formula (1), the refractive power of the first lens unit G1 becomes excessive, and it is difficult to realize a large-aperture lens system. For this reason, such small f1/f is not preferable.

Conversely, when f1/f exceeds the upper limit value of conditional formula (1), the refractive power of the first lens unit G1 becomes too small, resulting in a large lens system as a whole. In addition, the amount of marginal rays decreases when a wide field angle is assured. For this reason, such large f1/f is not preferable, either.

On the other hand, when f2/f exceeds the upper limit value of conditional formula (2), the negative refractive power of the second lens unit G2 becomes too strong, and such a strong refractive power is disadvantageous for assuring a wide field angle. For this reason, such large f2/f is not preferable.

Conversely, when f2/f is smaller than the lower limit value of conditional formula (2), the negative refractive power of the second lens unit G2 becomes too weak, and it becomes difficult to satisfactorily correct spherical aberration. In addition, it becomes difficult to correct a variation in aberration upon focusing. For this reason, such small f2/f is not preferable, either.

In order to suppress a variation in aberration upon focusing and to satisfactorily correct spherical aberration, the second lens unit G2 preferably comprises positive and negative lens components L21 and L22, each of which has a meniscus shape and has a convex surface facing the object side, and an air gap having a negative refractive power is preferably arranged between the positive and negative lens components L21 and L22.

As described above, according to the present invention, since the refractive power of the second lens unit G2 is weakened to some extent by conditional formula (2), the second lens unit G2 has an insufficient function as a focusing lens unit. As a result, the third lens unit G3 inevitably serves as a main focusing lens unit.

More specifically, according to the present invention, the third lens unit G3, which has been considered as a floating lens unit for correcting a close distance variation (a variation in aberration upon focusing to a close distance object) in a conventional lens system, constitutes the focusing lens unit, and the second lens unit G2, which has been considered as a focusing lens unit, serves as a floating lens unit for correcting a variation in aberration upon focusing to a close distance object.

Conditional formula (3) defines an appropriate range associated with the refractive power of the third lens unit G3 as a focusing lens unit.

When f3/f exceeds the upper limit value of conditional formula (3), the moving amount of the third lens unit G3 upon focusing becomes too large, resulting in a large lens system as a whole. When the air gap between the second and third lens units G2 and G3 is narrowed to avoid an increase in size of the lens system, the second and third lens units G2 and G3 interfere with each other upon focusing to a close distance object.

Conversely, when f3/f is smaller than the lower limit value of conditional formula (3), the refractive power of the third lens unit G3 becomes excessive. When a large-aperture lens system is to be realized, it becomes difficult to correct spherical aberration, and it becomes difficult to assure a predetermined back focus.

Conditional formula (4) defines an appropriate range associated with the ratio between the moving amounts of the second and third lens units G2 and G3 upon focusing to obtain good close distance performance.

When this ratio exceeds the upper limit value of conditional formula (4), the moving amount of the second lens unit G2 with respect to the third lens unit G3 becomes too large, and aberrations in a close distance in-focus state are excessively corrected.

Conversely, when the ratio is smaller than the lower limit value of conditional formula (4), the moving amount of the second lens unit G2 is too small, and the second lens unit G2 cannot sufficiently provide a function of a floating lens unit.

In this connection, correction of spherical aberration by the first lens unit G1 alone is normally insufficient, and correction of spherical aberration by the second lens unit G2 alone is normally excessive.

In the method of attaining focusing by moving only the third lens unit G3, when a lens, closest to the object side, in the third lens unit G3 is a negative lens component, spherical aberration tends to be insufficiently corrected with respect to a close distance object. Therefore, upon focusing to a close distance object, when the third lens unit G3 moves from the image side toward the object side, the second lens unit G2 is simultaneously extended toward the object side, thereby satisfactorily correcting a variation in spherical aberration in a close distance in-focus state.

On the other hand, when a lens, closest to the object side, in the third lens unit G3 is a positive lens component, spherical aberration tends to be excessively corrected with respect to a close distance object. Therefore, upon focusing to a close distance object, when the third lens unit G3 moves from the image side toward the object side, the second lens unit G2 simultaneously moves from the object side toward the image side, thereby satisfactorily correcting a variation in spherical aberration in a close distance in-focus state.

More specifically, the moving direction of the second lens unit G2 is determined depending on the lens arrangement of the third lens unit G3, and conditional formula (4) can be rewritten as conditional formula (5) below:

$$-0.02 < i \cdot (x2/x3) < -0.3 \qquad (5)$$

where i assumes a value, "+1", when the sign of the refractive power of a lens, closest to the object side, in the third lens unit G3, is positive; a value, "−1", when it is negative.

The above and other objects, features and advantages of the present invention are explained hereinafter and may be better understood by reference to the drawings and the descriptive matter which follows.

DETAILED DESCRIPTION OF THE PREFERRED EMBODIMENT

In each of the embodiments, a large-aperture medium-range telephoto lens system according to the present invention comprises, in the following order from the object side, a first lens unit G1 having a positive refractive power, a second lens unit G2 having a negative refractive power, and a third lens unit G3 having a positive refractive power. Upon focusing, the first lens unit G1 is fixed in position, and the third and third lens units G2 and G3 move along the optical axis.

The embodiments of the present invention will be described hereinafter with reference to the accompanying drawings.

[First Embodiment]

Figure 1:
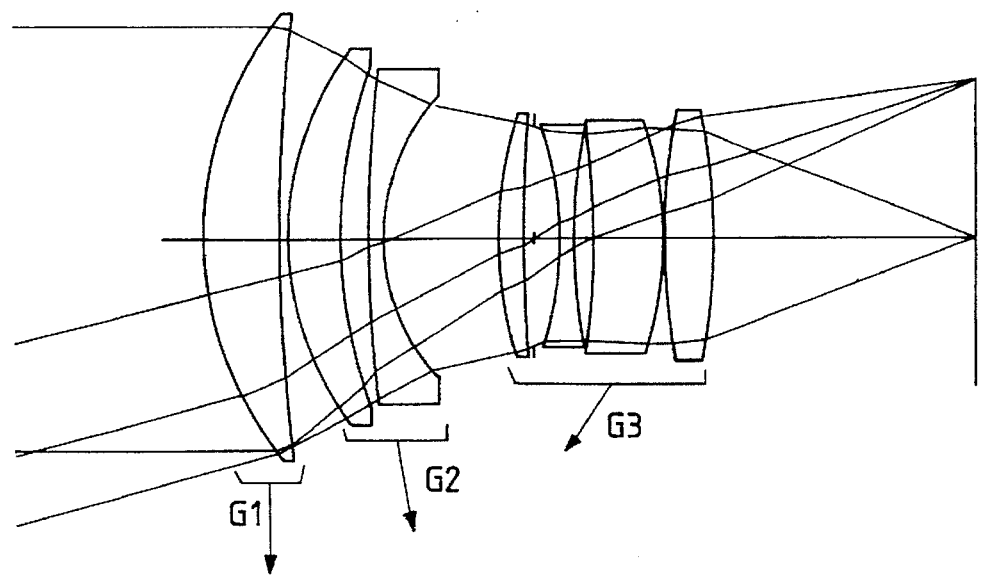
FIG. 1 is a view showing the lens arrangement of a large-aperture medium-range telephoto lens system according to the first embodiment of the present invention.

FIG. 1 shows the lens arrangement of a large-aperture medium-range telephoto lens system according to the first embodiment of the present invention.

The large-aperture medium-range telephoto lens system shown in FIG. 1 comprises, in the following order from the object side, a first lens unit G1 consisting of a positive meniscus lens with a convex surface facing the object side, a second lens unit G2 consisting of a positive meniscus lens with a convex surface facing the object side and a negative meniscus lens with a convex surface facing the object side, and a third lens unit G3 consisting of a positive meniscus lens with a convex surface facing the object side, an aperture stop, a biconcave lens, a positive meniscus lens with a concave surface facing the object side, and a biconvex lens.

As described above, the lens, closest to the object side, in the third lens unit G3 is a positive lens. Therefore, upon focusing from an infinity position to a close distance object, the third lens unit G3 moves toward the object side, and the second lens unit G2 moves toward the image side.

Table 1 below summarizes data values according to the first embodiment of the present invention. In Table 1, f is the focal length, FN is the f-number, 2ω is the field angle, Bf is the back focus, TL is the total lens length, R is the photographing distance, and β is the photographing magnification.

Furthermore, numerals in the leftmost column represent the order of lens surfaces from the object side, r is the radius of curvature of each lens surface, d is the lens surface interval, and n and ν are respectively the refractive index and Abbe's number for the d-line (λ=587.6 nm).

TABLE 1 f = 85.00
Bf = 38.21
TL = 112.71
FN = 1.43
R = 850.00
(β = −0.113)
2ω = 28.4°

| | r | d | n | ν |
|---|---|---|---|---|
| 1 | 49.7281 | 11.1000 | 1.74810 | 52.28 |
| 2 | 255.5724 | (d2 = variable) | | |
| 3 | 41.6456 | 7.6000 | 1.80218 | 44.69 |
| 4 | 63.2919 | 4.0000 | | |
| 5 | 147.1509 | 2.4000 | 1.73038 | 25.48 |
| 6 | 27.5278 | (d6 = variable) | | |
| 7 | 54.0728 | 3.6000 | 1.80454 | 39.61 |
| 8 | 191.9587 | 5.3000 | | |
| 9 | −47.8810 | 2.0000 | 1.69895 | 30.05 |
| 10 | 70.7529 | 3.3000 | | |
| 11 | −75.9563 | 9.9000 | 1.80218 | 44.69 |
| 12 | −52.8729 | 0.2000 | | |
| 13 | 88.9017 | 7.1000 | 1.80218 | 44.69 |

TABLE 1-continued

| 14 | −82.5631 | (Bf) | |
|---|---|---|---|

(Variable Intervals Upon Focusing)

| f, β | 85.0001 | −0.0333 | −0.1128 |
|---|---|---|---|
| d2 | 1.0000 | 1.1732 | 1.5505 |
| d6 | 17.0000 | 13.3628 | 5.4428 |
| Bf | 38.2089 | 41.6729 | 49.2157 |
| R | ∞ | 2629.2711 | 850.0000 |

(Condition Corresponding Values)

(1) f1/f = 0.9491
(2) f2/f = −1.0599
(3) f3/f = 0.8058
(4) x2/x3 = −0.0500

Figure 2A:
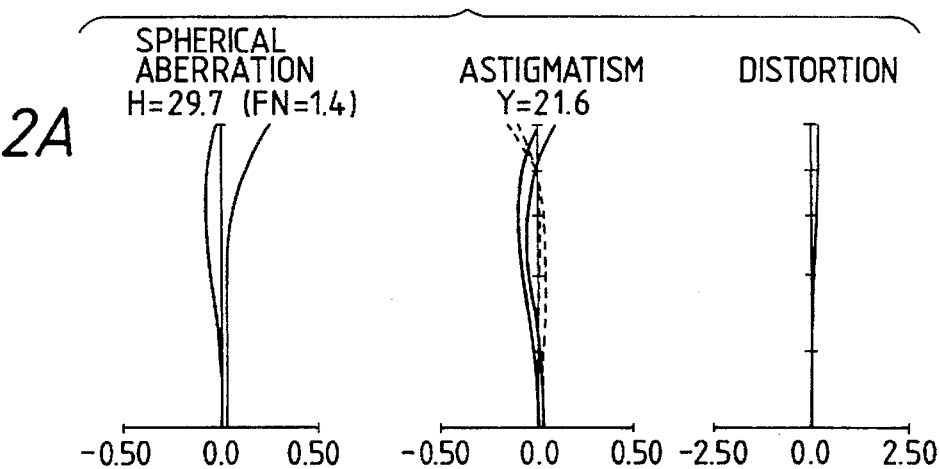
FIGS. 2A to 2C are graphs showing various aberrations of the first embodiment.
Figure 2B:
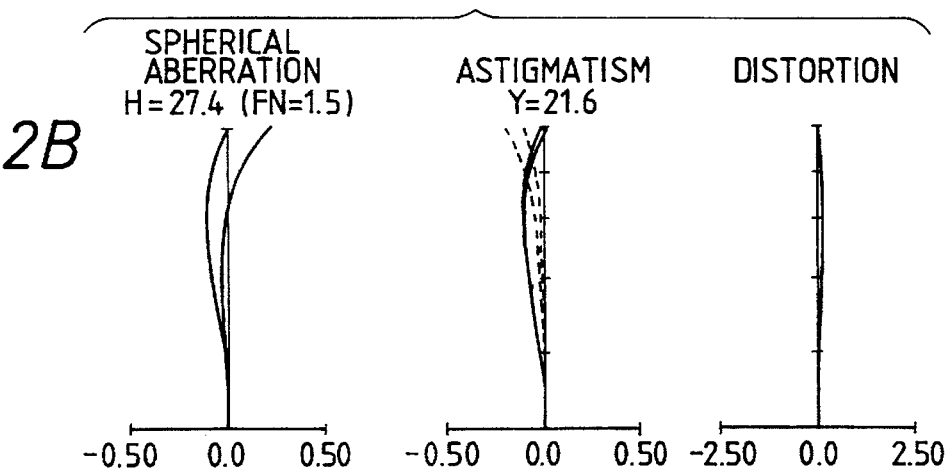
Figure 2C:
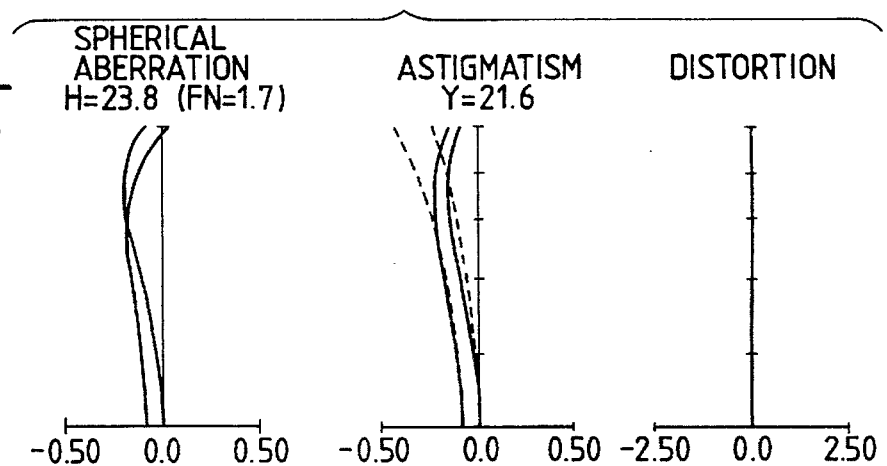

FIGS. 2A to 2C are graphs showing various aberrations of the first embodiment. FIG. 2A shows various aberrations in an infinity in-focus state, FIG. 2B shows various aberrations in a state of the photographing magnification β=−1/30, and FIG. 2C shows various aberrations in a closest distance photographing state.

In these graphs, FN is the f-number, Y is the image height, H is the height of incident light, d is the d-line (λ=587.6 nm), and g is the g-line (λ=435.8 nm).

In each graph showing astigmatism, a solid curve represents the sagittal image surface, and a broken curve represents the meridional image surface.

As can be seen from these graphs, in this embodiment, various aberrations are satisfactorily corrected from the infinity in-focus state to the closest distance photographing state.

[Second Embodiment]

Figure 3:
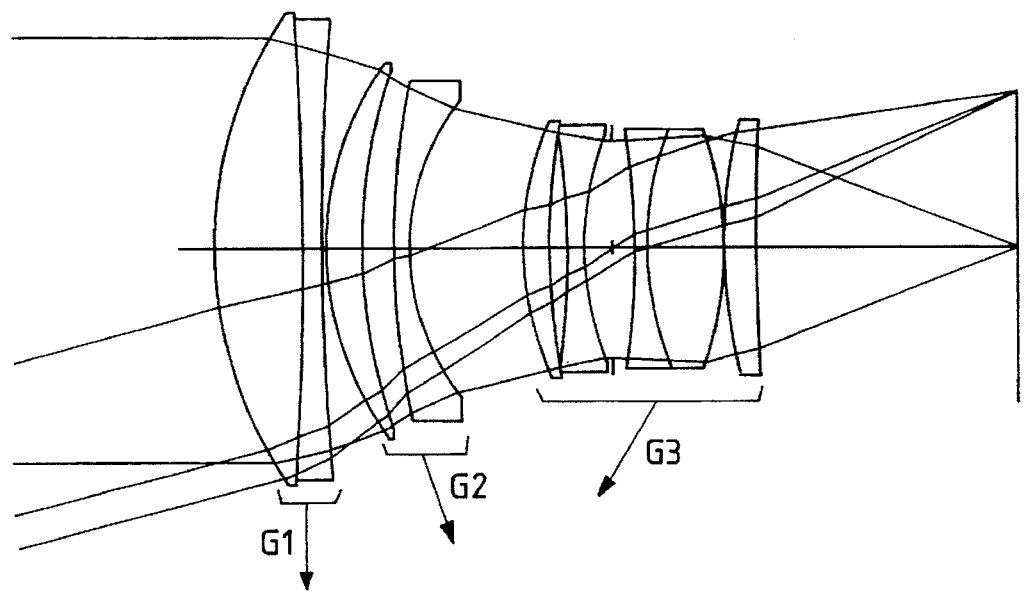
FIG. 3 is a view showing the lens arrangement of a large-aperture medium-range telephoto lens system according to the second embodiment of the present invention.

FIG. 3 shows the lens arrangement of a large-aperture medium-range telephoto lens system according to the second embodiment of the present invention.

The large-aperture medium-range telephoto lens system shown in FIG. 3 comprises, in the following order from the object side, a first lens unit G1 consisting of a positive meniscus cemented lens of a biconvex lens and a biconcave lens, a second lens unit G2 consisting of a positive meniscus lens with a convex surface facing the object side and a negative meniscus lens with a convex surface facing the object side, and a third lens unit G3 consisting of a positive meniscus lens with a convex surface facing the object side, a biconcave lens, an aperture stop, a positive meniscus cemented lens of a biconcave lens and a biconvex lens, and a positive meniscus lens with a convex surface facing the object side.

As described above, the lens, closest to the object side, in the third lens unit is a positive lens. Therefore, upon focusing from an infinity position to a close distance object, the third lens unit G3 moves toward the object side, and the second lens unit G2 moves toward the image side.

Table 2 below summarizes data values according to the second embodiment of the present invention. In Table 2, f is the focal length, FN is the f-number, 2ω is the field angle, Bf is the back focus, TL is the total lens length, R is the photographing distance, and β is the photographing magnification.

Furthermore, numerals in the leftmost column represent the order of lens surfaces from the object side, r is the radius of curvature of each lens surface, d is the lens surface interval, and n and ν are respectively the refractive index and Abbe's number for the d-line (λ=587.6 nm).

TABLE 2 f = 85.00
Bf = 38.20
TL = 117.85
FN = 1.43
R = 850.00
(β = −0.113)
2ω = 28.4°

| | r | d | n | v |
|---|---|---|---|---|
| 1 | 57.4021 | 12.4000 | 1.69350 | 53.76 |
| 2 | −900.4057 | 3.0000 | 1.75692 | 31.62 |
| 3 | 363.1686 | (d3 = variable) | | |
| 4 | 42.5483 | 5.2000 | 1.80411 | 46.53 |
| 5 | 70.2957 | 4.5000 | | |
| 6 | 106.0933 | 2.4000 | 1.71736 | 29.46 |
| 7 | 31.1235 | (d7 = variable) | | |
| 8 | 41.8779 | 4.0000 | 1.80454 | 39.61 |
| 9 | 107.7349 | 2.8000 | | |
| 10 | −78.9278 | 2.2000 | 1.64831 | 33.75 |
| 11 | 40.5550 | 7.6000 | | |
| 12 | −89.3558 | 2.0000 | 1.67270 | 32.17 |
| 13 | 46.4520 | 10.9000 | 1.86994 | 39.81 |
| 14 | −58.3778 | 0.2000 | | |
| 15 | 73.6735 | 4.7000 | 1.78797 | 47.47 |
| 16 | 542.5546 | (Bf) | | |

(Variable Intervals Upon Focusing)

| f, β | 84.9996 | −0.0333 | −0.1132 |
|---|---|---|---|
| d3 | 0.7516 | 1.4575 | 3.0041 |
| d7 | 16.9980 | 12.7627 | 3.4835 |
| Bf | 38.1985 | 41.7279 | 49.4606 |
| R | ∞ | 2633.7594 | 850.0000 |

(Condition Corresponding Values)

(1) f1/f = 1.1579
(2) f2/f = −1.8774
(3) f3/f = 0.8981
(4) x2/x3 = −0.2000

Figure 4A:
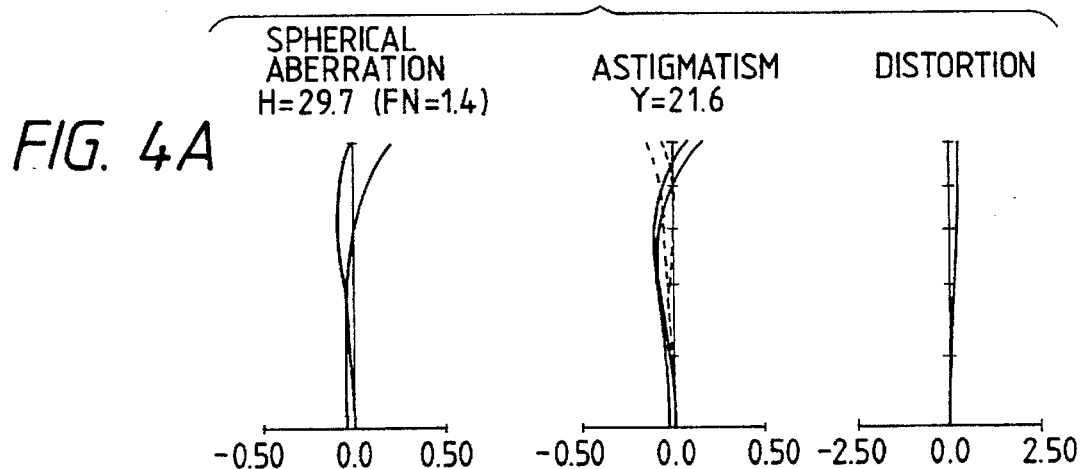
FIGS. 4A to 4C are graphs showing various aberrations of the second embodiment.
Figure 4B:
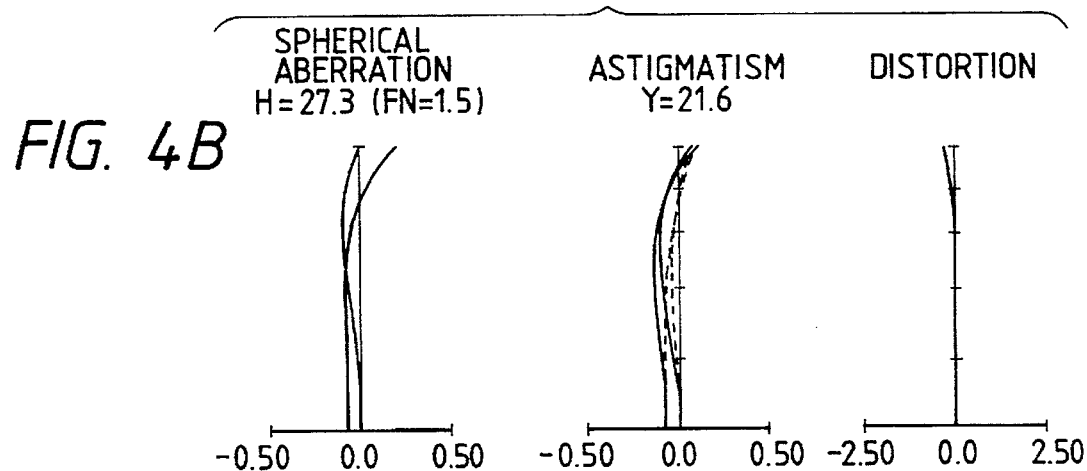
Figure 4C:
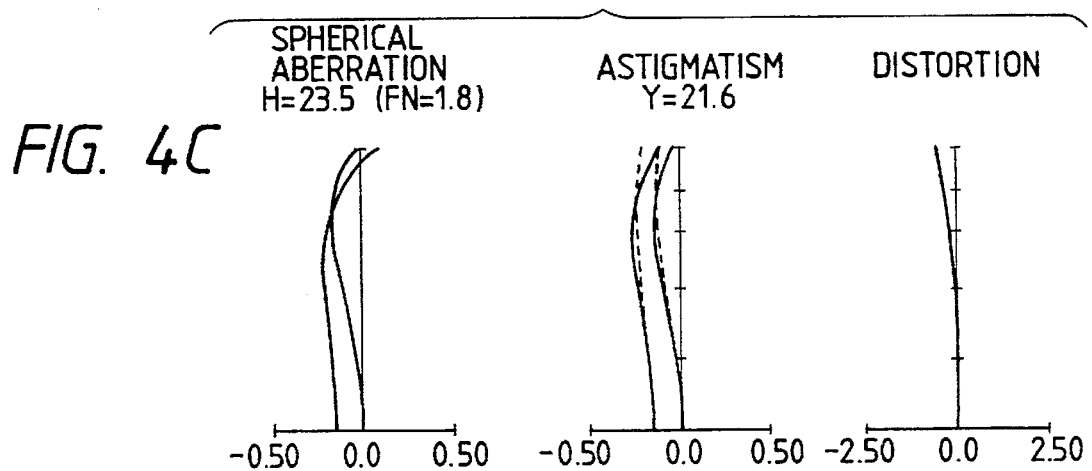

FIGS. 4A to 4C are graphs showing various aberrations of the second embodiment. FIG. 4A shows various aberrations in an infinity in-focus state, FIG. 4B shows various aberrations in a state of the photographing magnification β=−1/30, and FIG. 4C shows various aberrations in a closest distance photographing state.

In these graphs, FN is the f-number, Y is the image height, H is the height of incident light, d is the d-line (λ=587.6 nm), and g is the g-line (λ=435.8 nm).

In each graph showing astigmatism, a solid curve represents the sagittal image surface, and a broken curve represents the meridional image surface.

As can be seen from these graphs, in this embodiment, various aberrations are satisfactorily corrected from the infinity in-focus state to the closest distance photographing state.

[Third Embodiment]

Figure 5:
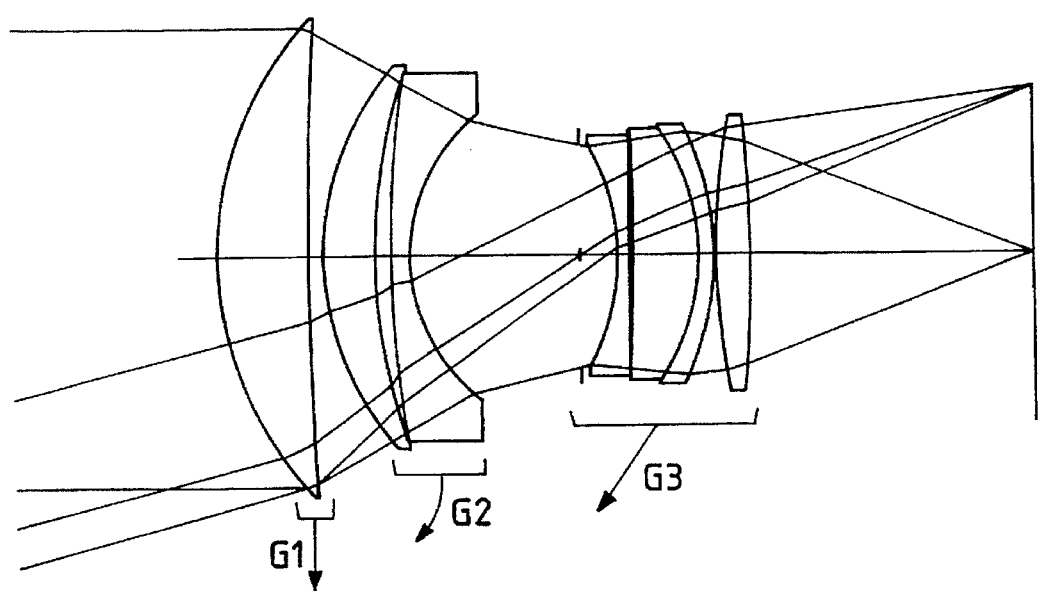
FIG. 5 is a view showing the lens arrangement of a large-aperture medium-range telephoto lens system according to the third embodiment of the present invention.

FIG. 5 shows the lens arrangement of a large-aperture medium-range telephoto lens system according to the third embodiment of the present invention.

The large-aperture medium-range telephoto lens system shown in FIG. 5 comprises, in the following order from the object side, a first lens unit G1 consisting of a positive meniscus lens with a convex surface facing the object side, a second lens unit G2 consisting of a positive meniscus lens with a convex surface facing the object side and a negative meniscus lens with a convex surface facing the object side, and a third lens unit G3 consisting of an aperture stop, a negative meniscus lens with a concave surface facing the object side, a cemented lens of a positive meniscus lens with a concave surface facing the object side and a negative meniscus lens with a concave surface facing the object side, and a biconvex lens.

As described above, the lens, closest to the object side, in the third lens unit G3 is a negative lens. Therefore, upon focusing from an infinity position to a close distance object, both the second and third lens units G2 and G3 move toward the object side. In this embodiment, the second lens unit G2 nonlinearly moves with respect to the third lens unit G3, thus enhancing the effect of close distance correction, unlike in the above two embodiments.

Table 3 below summarizes data values according to the third embodiment of the present invention. In Table 3, f is the focal length, FN is the f-number, 2ω is the field angle, Bf is the back focus, TL is the total lens length, R is the photographing distance, and β is the photographing magnification.

Furthermore, numerals in the leftmost column represent the order of lens surfaces from the object side, r is the radius of curvature of each lens surface, d is the lens surface interval, and n and ν are respectively the refractive index and Abbe's number for the d-line (λ=587.6 nm).

TABLE 3 f = 85.00
Bf = 38.20
TL = 110.82
FN = 1.43
R = 850.00
(β = −0.108)
2ω = 28.6°

| | r | d | n | v |
|---|---|---|---|---|
| 1 | 44.8766 | 12.1831 | 1.64000 | 60.04 |
| 2 | 462.1476 | (d2 = variable) | | |
| 3 | 34.9322 | 7.3000 | 1.84042 | 43.34 |
| 4 | 66.8348 | 2.2000 | | |
| 5 | 160.2959 | 2.4000 | 1.74000 | 28.19 |
| 6 | 22.8649 | (d6 = variable) | | |
| 7 | −27.7635 | 1.8000 | 1.74950 | 35.19 |
| 8 | −406.9941 | 0.3000 | | |
| 9 | −182.5160 | 8.8635 | 1.84042 | 43.34 |
| 10 | −27.4839 | 2.0000 | 1.65128 | 38.20 |
| 11 | −39.2876 | 0.2000 | | |
| 12 | 76.3344 | 4.9693 | 1.69680 | 55.61 |
| 13 | −139.8431 | (Bf) | | |

(Variable Intervals Upon Focusing)

| f, β | 85.0000 | −0.0333 | −0.1076 |
|---|---|---|---|
| d2 | 2.0000 | 1.9142 | 1.0876 |
| d6 | 28.4000 | 24.1964 | 16.2781 |
| Bf | 38.2015 | 42.4909 | 51.2357 |
| R | ∞ | 2586.2244 | 850.0000 |

(Condition Corresponding Values)

(1) f1/f = 0.9034
(2) f2/f = −1.0799
(3) f3/f = 0.7786
(4) x2/x3 = 0.0700

Figure 6A:
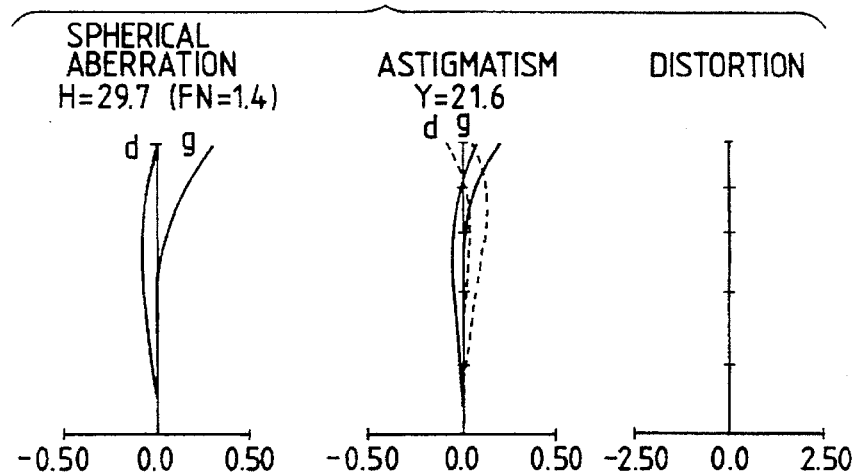
FIGS. 6A to 6C are graphs showing various aberrations of the third embodiment.
Figure 6B:
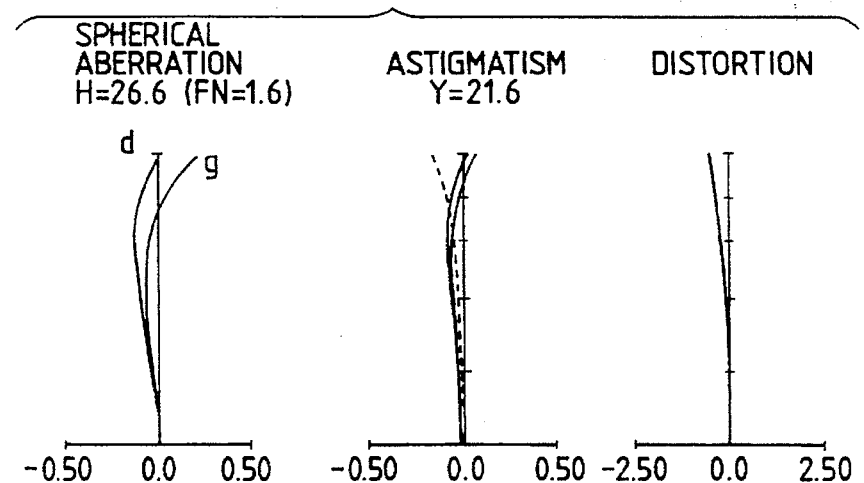
Figure 6C:
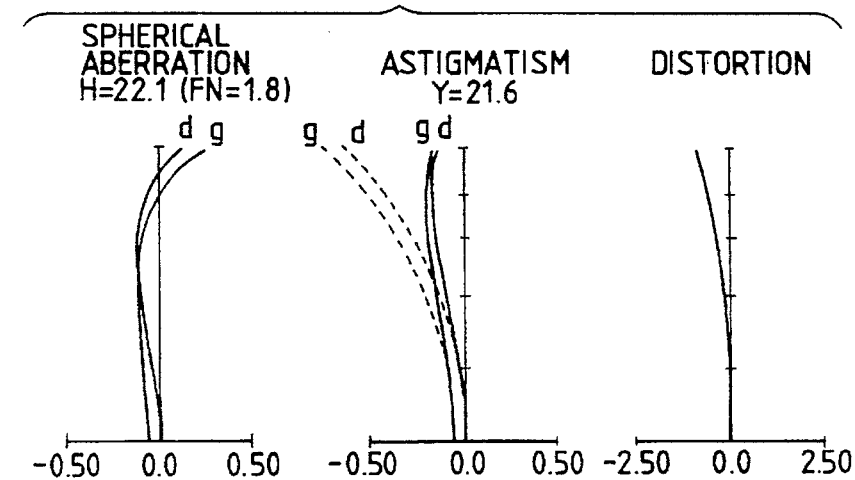

FIGS. 6A to 6C are graphs showing various aberrations of the third embodiment. FIG. 6A shows various aberrations in an infinity in-focus state, FIG. 6B shows various aberrations in a state of the photographing magnification β=−1/30, and FIG. 6C shows various aberrations in a closest distance photographing state.

In these graphs, FN is the f-number, Y is the image height, H is the height of incident light, d is the d-line (λ=587.6 nm), and g is the g-line (λ=435.8 nm).

In each graph showing astigmatism, a solid curve represents the sagittal image surface, and a broken curve represents the meridional image surface.

As can be seen from these graphs, in this embodiment, various aberrations are satisfactorily corrected from the infinity in-focus state to the closest distance photographing state.

Having described preferred embodiments of the present invention, it is to be understood that any variations will occur to those skilled in the art within the scope of the appended claims.

What is claimed is:

1. A large-aperture medium-range telephoto lens system, which comprises, in the following order from the object side, a first lens unit having a positive refractive power, a second lens unit having a negative refractive power, and a third lens unit having a positive refractive power, and said telephoto lens system attains focusing by moving said second and third lens units along an optical axis while said first lens unit is fixed in position, wherein said telephoto lens system satisfies:

$$0.8 < f1/f < 1.5$$
$$-3.0 < f2/f < -1.0$$
$$0.7 < f3/f < 1.0$$
$$0.02 < |x2/x3| < 0.3$$

where f is the focal length of the entire lens system in an infinity in-focus state, f1 is the focal length of said first lens unit, f2 is the focal length of said second lens unit, f3 is the focal length of said third lens unit, x2 is the moving amount of said second lens unit from the infinity in-focus state to a closest distance in-focus state, and x3 is the moving amount of said third lens unit from the infinity in-focus state to the closest distance in-focus state.

2. A telephoto lens system according to claim 1, wherein a lens, closest to the object side, in said third lens unit is a negative lens component, and upon focusing to a close distance object, both said second and third lens units move toward the object side.

3. A telephoto lens system according to claim 2, wherein said second lens unit comprises, in the following order from the object side, a positive lens component and a negative lens component, and said third lens unit comprises, in the following order from the object side, at least one negative lens component, and two positive lens components.

4. A telephoto lens system according to claim 3, wherein said positive lens component in said second lens unit is a positive meniscus lens with a convex surface facing the object side, and said negative lens component in said second lens unit is a negative meniscus lens with a convex surface facing the object side.

5. A telephoto lens system according to claim 1, wherein a lens, closest to the object side, in said third lens unit is a positive lens component, and upon focusing to a close distance object, said second lens unit moves toward the image side, while said third lens unit moves toward the object side.

6. A telephoto lens system according to claim 5, wherein said second lens unit comprises, in the following order from the object side, a positive lens component and a negative lens component, and said third lens unit comprises, in the following order from the object side, at least one negative lens component, and two positive lens components.

7. A telephoto lens system according to claim 6, wherein said positive lens component in said second lens unit is a positive meniscus lens with a convex surface facing the object side, and said negative lens component in said second lens unit is a negative meniscus lens with a convex surface facing the object side.

8. A large-aperture medium-range telephoto lens system, which comprises, in the following order from the object side, a first lens unit consisting of a positive meniscus lens with a convex surface facing the object side, a second lens unit consisting of a positive meniscus lens with a convex surface facing the object side and a negative meniscus lens with a convex surface facing the object side, and a third lens unit consisting of a positive meniscus lens with a convex surface facing the object side, a biconcave lens, a positive meniscus lens with a concave surface facing the object side, and a biconvex lens, and in which said first lens unit is fixed in position upon focusing, wherein said telephoto lens system satisfies:

$$0.8 < f1/f < 1.5$$
$$-3.0 < f2/f < -1.0$$
$$0.7 < f3/f < 1.0$$

where f is the focal length of the entire lens system in an infinity in-focus state, f1 is the focal length of said first lens unit, f2 is the focal length of said second lens unit, f3 is the focal length of said third lens unit.

9. A telephoto lens system according to claim 8, wherein upon focusing to a close distance object, said second lens unit moves toward the image side, and said third lens unit moves toward the object side, wherein said telephoto lens system satisfies:

$$0.02 < |x2/x3| < 0.3$$

where x2 is the moving amount of said second lens unit from the infinity in-focus state to a closest distance in-focus state, and x3 is the moving amount of said third lens unit from the infinity in-focus state to the closest distance in-focus state.

10. A large-aperture medium-range telephoto lens system, which comprises, in the following order from the object side, a first lens unit consisting of a positive meniscus lens with a convex surface facing the object side, a second lens unit consisting of a positive meniscus lens with a convex surface facing the object side and a negative meniscus lens with a convex surface facing the object side, and a third lens unit consisting of a negative meniscus lens with a concave surface facing the object side, a cemented lens of a positive meniscus lens with a concave surface facing the object side and a negative meniscus lens with a concave surface facing the object side, and a biconvex lens, and in which said first lens unit is fixed in position upon focusing, wherein said telephoto lens system satisfies:

$$0.8 < f1/f < 1.5$$
$$-3.0 < f2/f < -1.0$$
$$0.7 < f3/f < 1.0$$

where f is the focal length of the entire lens system in an infinity in-focus state, f1 is the focal length of said first lens unit, f2 is the focal length of said second lens unit, f3 is the focal length of said third lens unit.

11. A telephoto lens system according to claim 10, wherein upon focusing to a close distance object, both said second and third lens units move toward the object side, wherein said telephoto lens system satisfies:

$$0.02 < |x2/x3| < 0.3$$

where x2 is the moving amount of said second lens unit from the infinity in-focus state to a closest distance in-focus state, and x3 is the moving amount of said third lens unit from the infinity in-focus state to the closest distance in-focus state.

12. A large-aperture medium-range telephoto lens system, which comprises, in the following order from the object side, a first lens unit consisting of a positive meniscus cemented lens of a biconvex lens and a biconcave lens, a second lens unit consisting of a positive meniscus lens with a convex surface facing the object side and a negative meniscus lens with a convex surface facing the object side, and a third lens unit consisting of a positive meniscus lens with a convex surface facing the object side, a biconcave lens, a positive meniscus cemented lens of a biconcave lens and a biconvex lens, and a positive meniscus lens with a convex surface facing the object side, and in which said first lens unit is fixed in position upon focusing, wherein said telephoto lens system satisfies:

$$0.8 < f1/f < 1.5$$
$$-3.0 < f2/f < -1.0$$
$$0.7 < f3/f < 1.0$$
$$0.02 < |x2/x3| < 0.3$$

where f is the focal length of the entire lens system in an infinity in-focus state, f1 is the focal length of said first lens unit, f2 is the focal length of said second lens unit, f3 is the focal length of said third lens unit, x2 is the moving amount of said second lens unit from the infinity in-focus state to a closest distance in-focus state, and x3 is the moving amount of said third lens unit from the infinity in-focus state to the closest distance in-focus state, and upon focusing to a close distance object, said second lens unit moves toward the image side, and said third lens unit moves toward the object side.

* * * * *